United States Patent [19]
Imaida et al.

[11] Patent Number: 6,089,999
[45] Date of Patent: Jul. 18, 2000

[54] ARRANGEMENT OF PULLEY CYLINDER IN A BELT-TYPE CONTINUOUSLY VARIABLE TRANSMISSION

[75] Inventors: Makoto Imaida, Kanagawa; Kiyofumi Tanaka, Tokyo; Yusuke Kasuya; Masahiko Yamada, both of Aichi, all of Japan

[73] Assignees: Nissan Motor Co., Ltd., Yokohama; Aichi Machine Industry Co. Ltd., Nagoya, both of Japan

[21] Appl. No.: 09/010,577

[22] Filed: Jan. 22, 1998

[30] Foreign Application Priority Data

Jan. 24, 1997 [JP] Japan .................................. 9-011626

[51] Int. Cl.[7] .................................................. F16H 59/00
[52] U.S. Cl. ................................. 474/18; 474/28
[58] Field of Search ........................ 474/18, 28; 477/45, 477/46, 47, 48, 49

[56] References Cited

U.S. PATENT DOCUMENTS

| | | | |
|---|---|---|---|
| 5,184,981 | 2/1993 | Wittke | 474/18 X |
| 5,439,419 | 8/1995 | Yamada et al. | 474/18 |
| 5,628,700 | 5/1997 | Yamada et al. | 474/18 |
| 5,697,866 | 12/1997 | Okahara | 477/169 |
| 5,711,730 | 1/1998 | Friedman et al. | 474/18 |
| 5,730,680 | 3/1998 | Toukura | 477/46 |
| 5,749,804 | 5/1998 | Toukura . | |
| 5,776,022 | 7/1998 | Schellekens | 474/18 |
| 5,803,846 | 9/1998 | Yamada et al. | 474/18 |
| 5,803,862 | 9/1998 | Ochiai et al. . | |
| 5,871,417 | 2/1999 | Suzuki . | |
| 5,931,884 | 8/1999 | Ochiai et al. . | |
| 5,941,787 | 8/1999 | Imaida et al. . | |

FOREIGN PATENT DOCUMENTS 8-14347  1/1996  Japan .

*Primary Examiner*—John A. Jeffery
*Assistant Examiner*—Marcus Charles
*Attorney, Agent, or Firm*—Foley & Lardner

[57] ABSTRACT

In a pulley arrangement of a belt-type continuously variable transmission, a ring member (6) integrated with a first cylinder member (3) is coupled to a second cylinder member (5) using splines (6d and 5c) to limit mutual movements of the first and second cylinder members and using snap ring (7) to limit the axial displacement therebetween in peripheral directions of the respective first and second cylinder members. The first cylinder member is slidably contacted on an outer peripheral surface of a hollow cylindrical portion of a second conical pulley component. The second cylinder member is fixed onto an outer peripheral surface of a shaft portion of a first conical pulley component. In addition, a another stopper is provided between an outer peripheral end of the hollow cylindrical portion (56d) and an inner peripheral surface of the second piston member (8) for limiting mutual movements of the second piston member and the hollow cylindrical portion in the peripheral directions of the second piston member and the hollow cylindrical portion.

13 Claims, 5 Drawing Sheets

ARRANGEMENT OF PULLEY CYLINDER IN A BELT-TYPE CONTINUOUSLY VARIABLE TRANSMISSION

The contents of Application No. Heisei 9-11626, with a filing date of Jan. 24, 1997 in Japan, are herein incorporated by reference.

BACKGROUND OF THE INVENTION a) Field of the Invention

The present invention relates to an arrangement of a pulley cylinder of a tandem-type pulley cylinder for a vehicular belt-type continuously variable transmission which prevents a development of a relative displacement between a first cylinder member and a second cylinder member, both of the first and second cylinder members constituting the pulley cylinder, in their peripheral directions along with a revolution of a related shaft portion of a stationary conical pulley component.

b) Description of the Related Art

A Japanese Patent Application First Publication No. Heisei 8-14347 published on Jan. 16, 1996 exemplifies a movable sheave drive mechanism of a previously proposed belt-type continuously variable transmission.

In the previously proposed belt-type continuously variable transmission disclosed in the above-identified Japanese Patent Application First Publication, a movable conical pulley component is provided with a hollow sheave cylindrically shaped portion located on a rear surface portion of the movable sheave with respect to a conical face on which a V-belt is wound. A movement of the movable conical pulley component is restricted by means of an shaft member (drive shaft) so that the hollow cylindrically-shaped portion is movable along an axial direction of the shaft portion of the stationary conical component. Pressurized working fluid pressures within two cylinder chambers aligned in the axial direction of the shaft portion and formed on a space above the rear surface cause the movable conical pulley component to be moved toward or away from the opposing stationary conical pulley component.

The previously proposed cylinder structure forming the partitioned cylinder chambers will be described below in details.

One end of a first piston member is fixed onto the rear surface of the movable conical pulley component. The first piston member is in an approximately cylindrical portion of a first cylinder member is contacted with an outer peripheral surface of the first piston member via a seal member so as to be enabled to be slid in an axial direction and in a peripheral direction. The first cylinder member is in an approximately lateral U-shaped cross section. The approximately U-shaped inner peripheral surface of the first cylinder member is contacted with the cylindrically shaped portion of the movable conical component via another seal member so as to be enabled to be slid in an axial direction thereof and a peripheral direction thereof. A first cylinder chamber is formed by means of the first piston member, the first cylinder member, and the movable conical pulley component.

In addition, an opposing end of an approximately lateral U-shaped second cylinder member is contacted against an outer peripheral end of the first cylinder member through the axial direction of the shaft portion. An inner peripheral surface of the second cylinder member is coaxially fixed onto the shaft portion.

Furthermore, a disc-shaped second piston member is coaxially arranged on the shaft portion within the second cylinder chamber. An outer peripheral surface of the second piston member is contacted with an inner peripheral surface of the second cylinder member via a seal member so as to be enabled to be slid in both axial and peripheral directions.

An inner peripheral surface of the second piston member is contacted against an inner peripheral portion of the movable conical pulley component so that a step portion formed on the inner peripheral portion of the movable conical pulley component causes an axial displacement toward the movable conical pulley component to be limited.

SUMMARY OF THE INVENTION

In such a tandem type pulley cylinder structure as described in the BACKGROUND OF THE INVENTION, since the first piston member is fixed onto the shaft portion via the movable conical pulley component and the second shaft portion of the stationary pulley component is fixed onto the axle member, both of the first piston member and the second cylinder member do not make a relative displacement in their peripheral directions with respect to the shaft portion due to a revolution of the shaft portion of the stationary conical pulley component.

On the other hand, the first cylinder member and the second piston member are not fixed onto the shaft portion of the stationary conical pulley component nor fixed onto the movable pulley component.

It is, therefore, an object of the present invention to provide a pulley arrangement for a belt-type continuously variable transmission which prevents peripherally directed relative displacements of both or either of the first cylinder member with respect to the second cylinder member and/or the second piston member with respect to the hollow cylindrical portion of the movable conical pulley component along with the revolution of the shaft portion of the stationary pulley component.

The above-described object can be achieved by providing a pulley arrangement comprising: a first conical pulley component including a shaft portion and a first conical face; a second conical pulley component mounted onto the shaft portion for rotation therewith and including a second conical face opposed to the first conical face, the second conical pulley component being slidably mounted onto the shaft portion for movement relative to the shaft portion in such a direction as to vary a distance between the opposed first and second conical faces; a pulley cylinder chamber formed on a rear surface of the second conical pulley component with respect to the second conical face thereof, the pulley cylinder chamber including: an approximately cylindrical first piston member having one end fixed onto the rear surface of the second conical pulley component and extending coaxially toward a direction away from the second conical face with respect to the shaft portion; a first seal member; a first cylinder member having an inner peripheral surface slidably contacted on an opening end of the first piston member via the first seal member, extending toward the direction away from the second conical face coaxially with respect to the shaft portion, and defining a first cylinder chamber together with the rear surface of the second conical pulley component; a second seal member via which an inner peripheral end of the first cylinder member is slidably contacted on the rear surface of the second conical pulley component; a second cylinder member having an opening end contacted on the first cylinder member so as to support as to support the first cylinder member in an axial direction of the shaft portion and having an inner peripheral end mounted onto an outer peripheral surface of the shaft portion; a third seal member; an approximately hollow disc-shaped second piston member having an outer peripheral surface slidably contacted on an inner peripheral end of the second cylinder member in the axial direction of the shaft portion via the third seal member and having an inner peripheral surface fixed onto the rear surface of the second conical pulley component so as to define a second cylinder chamber together with the second cylinder member; and a first stopper coupled between the first cylinder member and the second cylinder member for limiting mutual movements of both of the first cylinder member and the second cylinder member in a peripheral direction of each of the first and second cylinder members.

The above-described object can also be achieved by providing a pulley arrangement comprising: a first conical pulley component including a shaft portion and a first conical face; a second conical pulley component mounted onto the shaft portion for rotation therewith and including a second conical face opposed to the first conical face, the second conical pulley component being slidably mounted onto the shaft portion for movement relative to the shaft portion in such a direction as to vary a distance between the opposed first and second conical faces; a pulley cylinder chamber formed on a rear surface of the second conical pulley component with respect to the second conical face thereof, the pulley cylinder chamber including: an approximately cylindrical first piston member having one end fixed onto the rear surface of the second conical pulley component and extending coaxially toward a direction away from the second conical face with respect to the shaft portion; a first seal member; a first cylinder member having an inner peripheral surface slidably contacted on an opening end of the first piston member via the first seal member, extending toward the direction away from the second conical face coaxially with respect to the shaft portion, and defining a first cylinder chamber together with the rear surface of the second conical pulley component; a second seal member via which an inner peripheral end of the first cylinder member is slidably contacted on the rear surface of the second conical pulley component; a second cylinder member having an opening end contacted on the first cylinder member so as to support the first cylinder member in an axial direction of the shaft portion and having an inner peripheral end mounted onto an outer peripheral surface of the shaft portion; a third seal member; an approximately hollow disc-shaped second piston member having an outer peripheral surface slidably contacted on an inner peripheral end of the second cylinder member in the axial direction of the shaft portion via the third seal member and having an inner peripheral surface fixed onto the rear surface of the second conical pulley component so as to define a second cylinder chamber together with the second cylinder member; and a stopper provided between the inner peripheral surface of the second piston member and an outer peripheral end of a hollow cylindrical portion of the second conical pulley component for limiting mutual movements of the second piston member and the hollow cylindrical portion in the peripheral direction of each of the second piston member and the hollow cylindrical portion.

BEST MODE FOR CARRYING OUT THE INVENTION

Reference will hereinafter be made to the drawings in order to facilitate a better understanding of the present invention.

Figure 1:
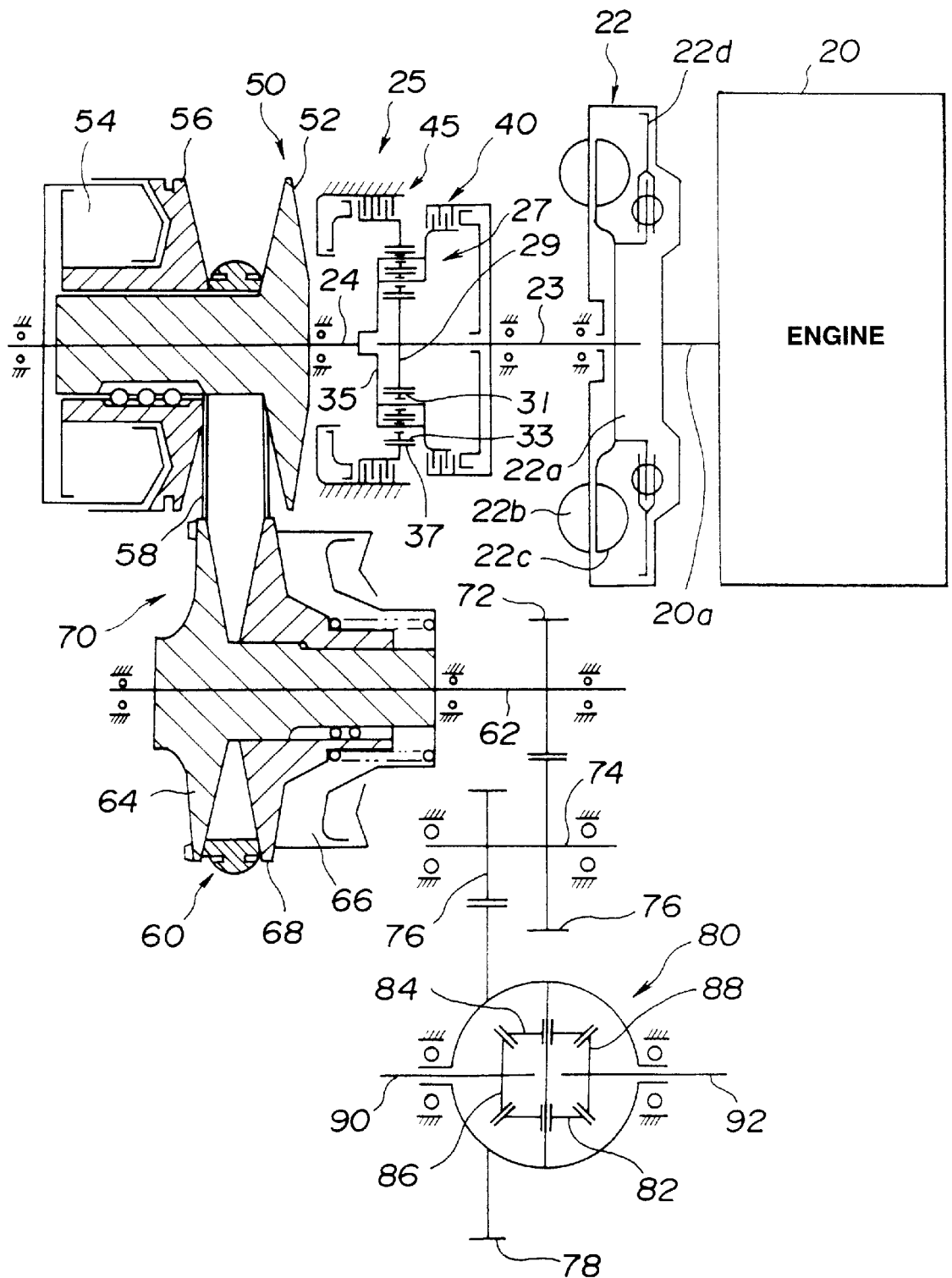
FIG. 1 is a whole skeleton view of a power transmission mechanism of a belt-type continuously variable transmission to which a pulley arrangement in a preferred embodiment according to the present invention is applicable.

First, FIG. 1 shows a skeleton view in a power transmission system of a belt-type (so-called, V-belt type) continuously variable transmission to which a pulley arrangement in a preferred embodiment according to the present invention is applicable.

In FIG. 1, an engine 20 as a prime mover of an automotive vehicle has an output shaft 20a linked to a fluid coupling device 22 as a fluid transmission device (specifically, a torque converter). The fluid coupling device 22 is provided with a lock-up mechanism.

An output axle of the fluid coupling device 22 is linked to a rotary shaft 23. The rotary shaft 23 is linked to a forward/reverse change-over mechanism 25. The forward/reverse change-over mechanism 25 includes a planetary gear mechanism 27, a forwarding clutch 40, and a reverse brake 45.

The planetary gear mechanism 27 includes a sun gear 29, a pinion carrier 35 having two pinion gears 31 and 33, and an internal gear 37. The sun gear 29 is linked to the rotary shaft 23 so as to always be integrally revolved with the rotary shaft 23. The pinion carrier 25 is enabled to be linked with the rotary shaft 23 by means of the forwarding clutch 40. In addition, the internal gear 37 is enabled to be fixed onto a stationary portion of the belt-type continuously variable transmission by means of the reverse brake 45. The pinion carrier 35 is linked to a drive shaft 24 arranged on an outer periphery of the rotary shaft 23.

The drive pulley 50 includes a stationary conical pulley component 52 and a movable conical pulley component 55, each conical pulley component having a conical face opposed to each other to form an approximately letter V-shaped pulley groove. A V belt 58 is wound about the V-shaped pulley groove to form an endless belt. The stationary conical pulley component 52 is integrated with the drive shaft 24. The movable conical pulley component 68 is attached onto a driven shaft 62 so as to be enabled to be moved only in an axial direction by means of a ball spline of a spline coupling and is movable in the axial direction of the driven shaft 62 by means of a hydraulic pressure acted upon a driven pulley working fluid cylinder chamber 66 formed on a rear surface thereof.

These drive pulley 50, V belt 58, and driven pulley 60 constitutes the V-belt type continuously variable transmission mechanism 70. A drive gear 72 is fixed onto a drive axle 62. The drive gear 72 is meshed with an idler gear 76 on an idler axle 74. A pinion gear 76 disposed on the idler axle 74 is always meshed with a final gear 78. A pair of pinion gears 82 and 84 are meshed with a pair of side gears 86 and 88, each side gear 86 and 88 being a corresponding one of a pair of output shafts 90 and 92.

A rotating force inputted from the output shaft 20a of the engine 20 into the power transmission mechanism is transmitted to the forward/reverse change-over mechanism 25 via the fluid coupling device 22 and the rotary shaft 23. At this time, the forwarding clutch 40 is engaged. When the reverse brake 45 is released, the rotating force of the rotary shaft 23 is transmitted to the drive shaft 24 in the same rotating direction via the integrally rotating planetary gear mechanism 27.

On the other hand, in a case where the forwarding clutch 40 is released and the reverse brake 45 is engaged, an action of the planetary gear mechanism 27 causes the rotating force of the rotary shaft 23 to be transmitted to the drive shaft 24 with its rotating direction reversed. The rotating force of the drive shaft 24 is transmitted to a differential device 80 via the drive pulley 50, the V belt 56, the driven pulley 62, the drive gear 72, an idler gear 76, the idler axle 74, the pinion gear 76, and the final gear 78 so that the output shafts 90 and 92 are revolved in the forward direction or reverse direction.

It is noted that in a case where both of the forwarding clutch 40 and the reverse brake 45 are released, the whole power transmission mechanism is in a neutral state.

When the power transmission is carried out, the movable conical pulley component 56 of the driven pulley 50 and the movable conical pulley component 68 of the driven pulley 60 are moved in the axial direction thereof, a radius of positions of the movable conical pulley components 56 and 68 contacted against the V belt 58 is varied so that a revolution ratio between the drive pulley 50 and the driven pulley 60 can be changed.

For example, when a width of the letter V-shaped pulley groove of the drive pulley 50 is widened together with a narrowing of a width of the letter V-shaped pulley groove of the driven pulley 60, the radius of the position of the corresponding movable conical pulley component contacted against the V belt 58 at the driven pulley 50 becomes reduced. The radius of the position of the corresponding movable conical pulley component contacted against the V belt 58 at the driven pulley 60 is, in turn, enlarged. Consequently, a large gear shift ratio can be achieved. If the movable conical pulley components 56 and 68 are moved in the opposite directions to the above-described directions, the gear shift ratio is, in turn, reduced.

Next, a whole structure of the drive pulley 50 and its drive mechanism in the belt-type continuously variable transmission shown in FIG. 1 will be described in more details with reference to FIG. 2.

Figure 2:
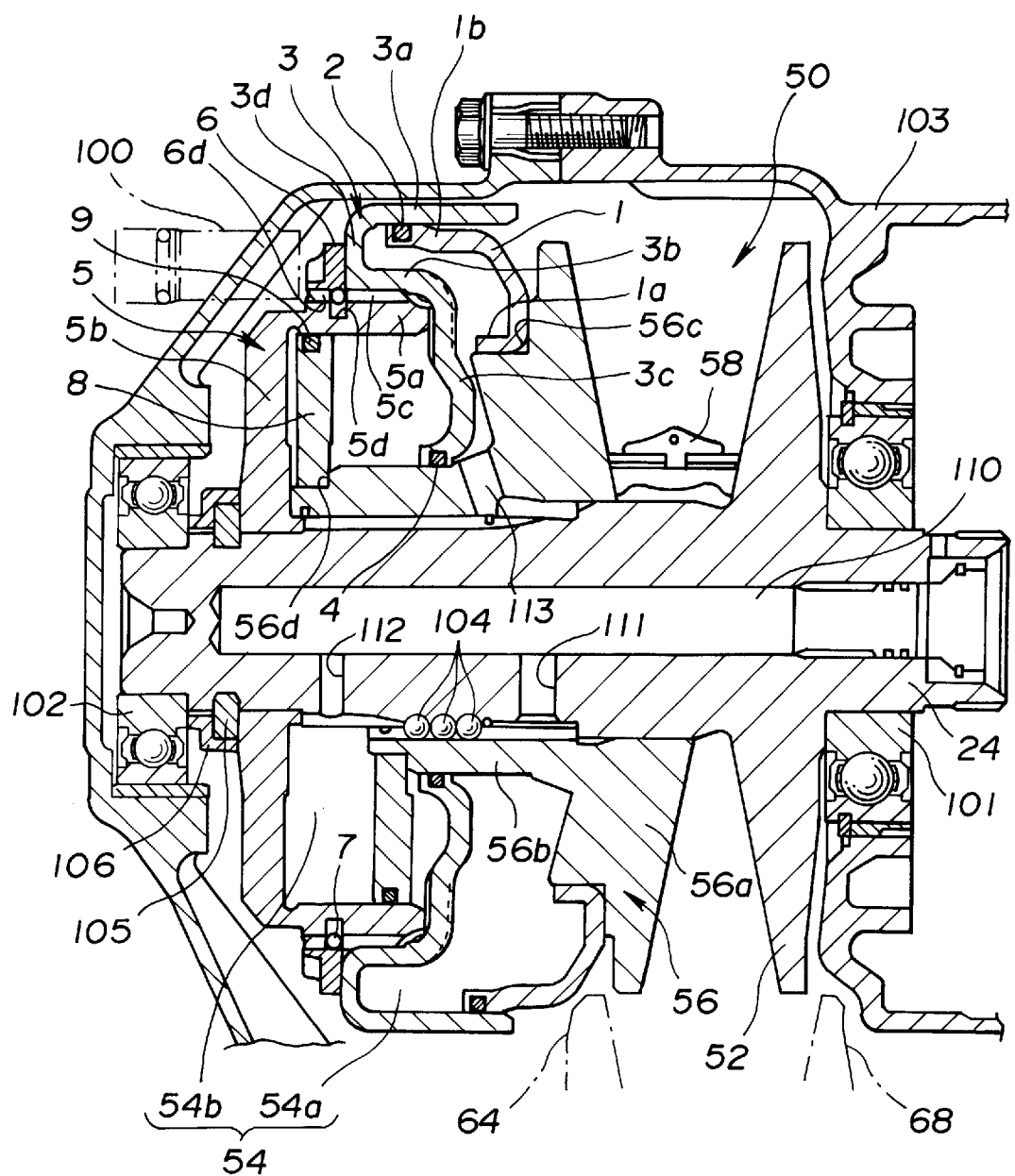
FIG. 2 is a side cross sectional view for explaining a drive pulley arrangement in the embodiment according to the present invention.

It is noted that an upper part of FIG. 2 with the drive shaft 24 as a center indicates that the movable conical pulley component 56 is separated from the stationary conical pulley component 52 and a lower part of FIG. 2 with the drive shaft 24 as the center indicates that the movable conical pulley component 56 is approached to the stationary conical pulley component 52.

The stationary conical pulley component 52 is integrated with the drive shaft 24 which is an axial member rotatably supported on a casing 103 via bearings 101 and 102.

The movable conical pulley component 56 includes: a main body (conically shaped main body) 56a coaxially arranged on an outer periphery of the drive shaft 24 and having a conical face opposed to the conical face of the stationary conical pulley component 52; and a hollow cylindrical portion 56b in an approximately cylindrical shape disposed integrally with an inner peripheral position of a rear surface (a surface not opposed to the stationary conical pulley component 52) of the pulley main body 56a.

The hollow cylindrical portion 56b is coaxially disposed on the outer periphery of the drive shaft 24 and is linked to the drive shaft 24 so that a ball spline of a spline coupling formed together with the drive shaft 24 allows the hollow cylindrical portion 56b of the movable conical pulley component 56 to be moved only in the axial direction of the drive shaft 24.

In FIG. 2, a reference numeral 104 denotes each ball (spherical body) of the ball spline.

A drive pulley cylinder chamber 54 is formed on a rear surface of the movable conical pulley component 56. The drive pulley cylinder chamber 54 is divided into a first cylinder chamber 54a and a second cylinder chamber 54b aligned in the axial direction of the drive shaft 24. The drive pulley cylinder chamber 54 used to drive the movable conical pulley component 56 to be moved constitutes a tandem-type cylinder structure.

An opening end 1a of an approximately cylindrically shaped first piston member 1 is fixed onto a step portion 56c formed on the rear surface of the movable conical pulley component main body 56a and is enclosed on the rear surface of the movable conical pulley component main body 56a. The first piston member 1 is axially arranged on the drive shaft 24 so as to be extended away from the stationary conical pulley component 52.

A ring-shaped first seal member 2 is attached along a peripheral direction of an outer peripheral surface of the other opening end 1b of the first piston member 1. An inner peripheral surface of an outer cylindrically shaped portion 3a of a first cylinder member 3 is contacted against the outer peripheral surface of the first piston member 1 via the first seal member 2 so that the first piston member 1 is enabled to be slid in the axial direction of the drive shaft 24 and in the peripheral direction of the first member 3.

The first cylinder chamber 3 includes: a) the above-described outer cylindrically shaped portion 3a extended coaxially along the drive shaft 24 in a direction so as to be separated from the stationary conical pulley component 52; b) an inner cylindrically shaped portion 3b extended coaxially with the drive shaft 24 toward the stationary conical pulley component 52 and which is continued with the outer cylindrically shaped portion 3a; and c) a disc-shaped portion 3c in an approximately disc-shaped form. An inner peripheral end of the first cylinder member 3 is slidably contacted on the outer peripheral surface of the hollow cylindrical portion 56b via a ring-shaped second seal member 4.

An inner peripheral surface of the disc-shaped portion 3c is contacted against an outer peripheral surface of the hollow cylindrical portion 56b of the movable conical pulley component 56. The inner portion 3b and the disc portion 3c constitute a bottom portion of the first cylinder member 3.

A space enclosed by the first piston member 1, the first cylinder member 3, and the movable conical pulley component 56 provides the first cylinder chamber 54a.

In addition, an opening end of the lateral U-shaped second cylinder member 5 arranged coaxially with the drive shaft 24 is linked to an outer surface of the first cylinder member 3, the second cylinder member 5 axially supporting the first cylinder member 3. An opening end 5a of the cylindrical portion 5b of the second cylinder member 5 is contacted with and enclosed on the disc portion 3c of the second cylinder member 3 through the axial direction of the drive shaft 24. The second cylinder chamber 54b is formed by partitioning a predetermined space with the inner peripheral surface of the disc portion 5b constituting the bottom portion of the second cylinder member 5 fixed onto an outer periphery of the drive shaft 24.

A linkage between the above-described second cylinder member 5 and the above-described first cylinder member 3 will be described below.

The second cylinder member 5 is formed with a multiple number of splines 5c (engagement surface portions) extended in the axial direction of the drive shaft 24 along the peripheral direction of the hollow cylindrical portion 56b. A part (opening end) of the splines 5c is contacted with an inner peripheral portion 3b of the first cylinder member 3. Then, both portions of the inner cylindrical portion 3b and of the opening end 5a of the second cylinder member 5 are linked together in a socket and spigot joint form. In addition, these portions are in a spline coupling to the ring member 6 welded to the link portion 3d. It is noted that the link portion 3d of the first cylinder member 3 is, as shown in FIG. 2, an approximately letter L-shaped cross sectional portion.

Figure 3:
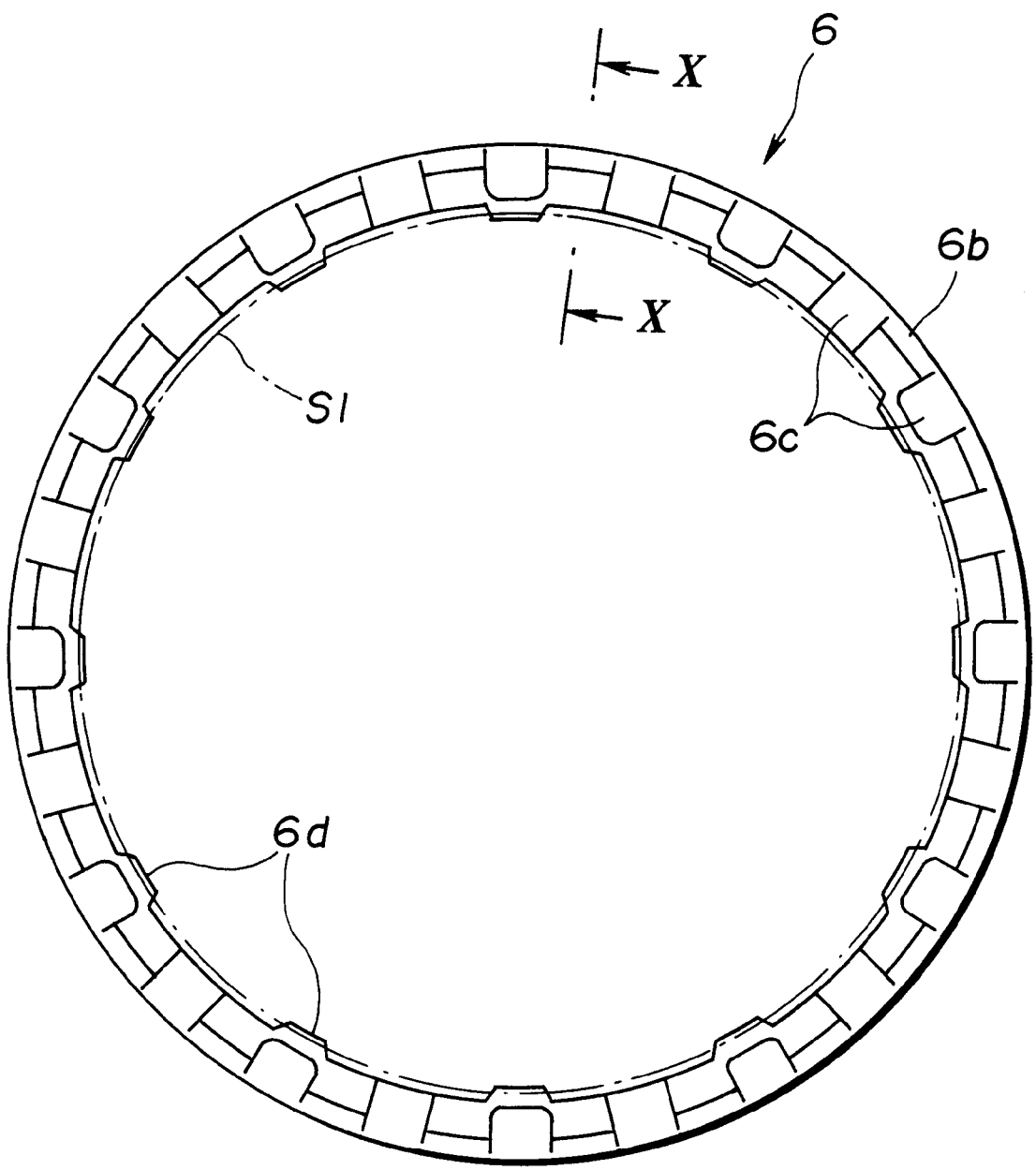
FIG. 3 is a front view for explaining a ring member in the embodiment shown in FIG. 2.
Figure 4:
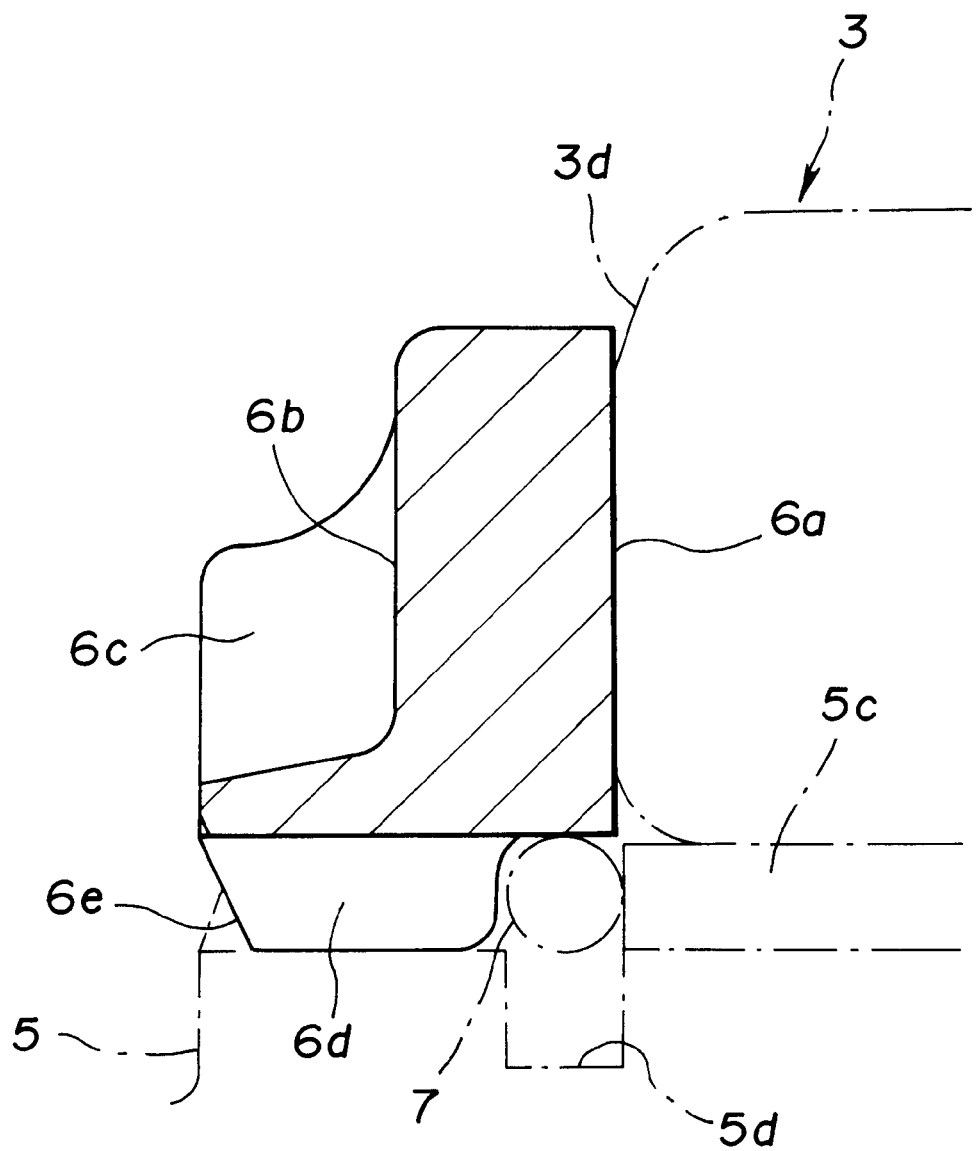
FIG. 4 is a partially expanded view of the ring member cut away along a line IV—IV of FIG. 3.

The ring member 6 has a shape as shown in FIG. 2 and FIG. 3 and, furthermore, shown in FIG. 4.

As typically shown in FIG. 3, one side surface 6a (the reference numeral 6a is shown in FIG. 4) constitutes a welded surface contacted and welded against the link portion 3d of the first cylinder member 3 coaxially through the axial direction of the drive shaft 24. The other side surface 6b (the reference numeral 6b is shown in FIG. 4) forms a rotor portion for a revolution speed sensor 100 with convex portions 6c along a peripheral direction at a regular interval of space.

In addition, convex portions are formed along an inner peripheral surface of the ring member 6 for each unit of a predetermined angular interval from a reference circle S1 toward a radial direction of the ring member 6. The respective convex portions constitute the splines 6d. These splines 6d are fitted into the opposing splines 5c which constitute the engagement surfaces formed on the outer peripheral surface of the second cylinder member 5.

Each spline 6d formed on the ring member 6, as shown in FIG. 4, is formed only on the inner peripheral surface of the other side surface 6b. An end surface 6e formed on the other side surface 6b of each convex portion at the corresponding one of the splines 6d is cut out obliquely with respect to the outer peripheral surface of the second cylinder member 5.

The outer cylindrically shaped portion 3a of the second cylinder member 3 opposed radially to the one side surface 6a on the inner peripheral surface of the ring member 6 is formed with a ring-shaped groove 5d (refer to FIG. 4) along the peripheral direction. A snap ring 7 is disposed at a center peripheral position in a radial direction of the ring-shaped groove 5d. The snap ring 7 is caught in from both sides thereof in the axial direction of the drive shaft 24 by means of the corresponding one of the splines 5c faced toward the movable conical pulley component 56 and by means of the corresponding one of the splines 6d of the ring member 6. Hence, the axial displacement of the first cylinder member 3 with respect to the second cylinder member 5 is restricted.

The assembly of the snap ring 7 into the groove 5d will be described below.

That is to say, when with the snap ring 7 attached onto the ring-shaped groove 5d, the second cylinder member 5 is fitted along the drive shaft 24 from a left-handed side as viewed from FIG. 2, the snap ring 7 is contacted on the end surface 6e of any one of the splines 6d of the ring member 6. Since the contacted end surface 6e is slanted, the snap ring 7 is pressed toward a more inside in the radial direction of the ring member 6 and escaped into the ring-shaped groove 5d as it is being fitted into the groove 5d.

The splines 5c of the second cylinder member 5 pass over the escaped snap ring 7. When this passage is finished, a self restoring force of the snap ring 7 causes the snap ring 7 to be returned toward an outer diameter direction.

This causes the snap ring 7 to be contacted axially against one of the splines 6d of the ring member 6 to function as a stopper.

As described above, the snap ring 7 can easily be assembled and it is not necessary to install the snap ring 7 on an outer end exposed side of the continuously variable transmission mechanism shown in FIG. 1.

The inner peripheral surface of the disc portion 5b of the second cylinder member 5 is fixed onto the drive shaft 24 in the following manner. As shown in FIG. 2, the inner peripheral surface of the disc portion 5b is contacted on the step portion (spline end surface) formed on an outer periphery of the drive shaft 24. Then, a rear surface of the inner peripheral surface of the disc portion 5b is pressed by means of the bearing 102 via a separator 106, the axial movement of the second cylinder member 5 being limited by means of a letter C-shaped ring member 105.

An approximately hollow disc-shaped second piston member 8 is coaxially arranged on the drive shaft 24 in the second cylinder chamber 54b. The second cylinder chamber 54b is partitioned into two chambers with respect to the axial direction of the drive shaft 24. An outer peripheral surface of the second piston member 8 is slidably contacted with the inner peripheral surface of the second cylinder chamber 5 via a ring-shaped third seal member 9 so as to be enabled to be slid in its axial direction and its peripheral direction.

In addition, an inner peripheral surface of the second piston member 8 is contacted against the hollow cylindrical portion 56b of the movable conical pulley component 56. The step portion 56d formed on the hollow cylindrical portion 56b causes the axial displacement toward the movable conical pulley component 56 to be limited. The stopper formed between radially opposed surfaces causes the relative displacement in the peripheral direction of both second piston member 8 and movable conical pulley component 56 to be limited so as to be linked to the hollow cylindrical portion 56b of the movable conical pulley component 56. It is noted that the step portion 56c is also called a rear recessed portion.

Figure 5:
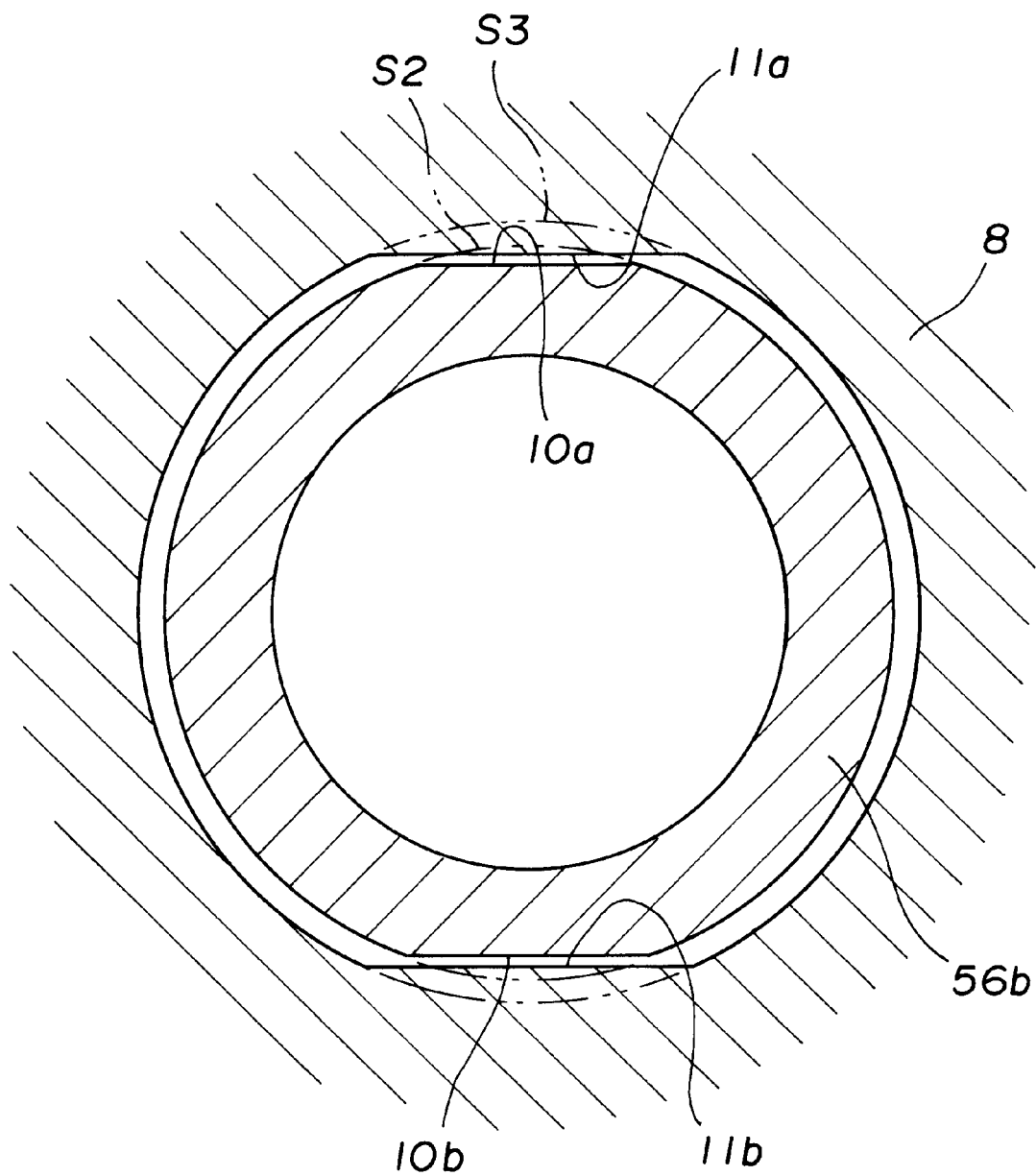
FIG. 5 is a cross sectional view indicating a connection state between a hollow cylindrical portion of a movable conical pulley component and a second piston member in the embodiment shown in FIG. 2.

FIG. 5 shows the stopper formed between the second piston member 8 and the hollow cylindrical portion 56b of the movable conical pulley component 56.

A first pair of flat surfaces (planes) 10a and 10b are formed constituting a width-across-flats fitting on the outer peripheral surface of the hollow cylindrical portion 56b. A second pair of flat surfaces (planes) 11a and 11b constituting the width-across-flats fitting and engaged so as to be opposed to one of the first pair of flat surfaces (planes) 10a and 10b are formed on the inner surface of the second piston member 8.

In details, a part of a reference circle S2 defining a contour on an inner peripheral surface of the hollow cylindrical portion 56b of the movable conical pulley component 56 is set as a flat surface whose shape in the radial direction is different from the reference circle S2. Hence, the engagement surface portions 10a and 10b of the hollow cylindrical portion 56b which have the shape in the radial direction is set as the flat engagement surfaces 11a and 11b whose radial directional shapes are different from another reference circle S3.

That is to say, the hollow cylindrical portion 56b and the second piston member 8 are coupled together in the, so-called, width-across-flats fitting so that their relative displacements in the peripheral directions are restricted. The first and second pair of flat surfaces 10a and 10b and 11a and 11b constituting the width-across-flat fitting are disposed symmetrically with respect to each other.

It may alternatively be not necessary to make the first and second pair of flat surfaces 10a and 10b and 11a and 11b parallel to the axis of the drive shaft 24. For example, they may be slanted toward the movable conical pulley component 56 so that their diameters become large.

The engagement surface constituting the stopper (two positions) is not limited to two surfaces in the peripheral direction but may be three surfaces (three positions).

The whole surface of opposing surfaces may be set as the engagement surface portions and the contour may be set in regular polygonal shapes such as regular hexagonal shapes.

In addition, the shape of the engagement surface is not limited to a flat surface but may be constituted by convex or recess shaped curved surface in its radial direction. For example, the whole contour of opposing surface may be set in an oval shape so as to have a different form of convex or recess in its radial direction form the reference circles S2 and S3.

Reference numerals 110 through 113 in FIG. 2 denote working fluid (oil) axially extended and approximately radially extended passages penetrated through the drive shaft 24 and the hollow cylindrical portion 56b of the movable conical pulley component 56 to supply the working fluid from a hydraulic source to the respective first and second cylinder chambers 54a and 54b.

Next, an action of the pulley arrangement in the embodiment described above will be described below.

In the above-described pulley cylinder arrangement, the working fluid supplied to each cylinder chamber 54a and 54b via the respective working fluid passages 110 through 113 causes a hydraulic pressure of the first cylinder chamber 54a and the second cylinder chamber 54b to be varied. Accordingly, the first piston member 1 and the second piston member 8 are individually moved or moved together in the axial direction of the drive shaft 24. Consequently, the movable conical pulley component 56 is approached to or separated from the stationary conical pulley component 52.

The cylinder members 3 and 5 and the piston members 1 and 8 constituting the respective cylinder chambers 54a and 54b are revolved together with the drive shaft 24.

At this time, since the peripheral displacement of the first cylinder member 3 to the second cylinder member 5 fixed onto the drive axle 24 is limited, the relative displacement in the peripheral direction between the first cylinder member 3 and the second cylinder member 5 can be prevented from being generated. Consequently, peripheral directional slips and/or twists of the first and second seal members 2 and 4 interposed between the first piston member 1 on which the first cylinder member 3 is slidably contacted and the hollow cylindrical portion 56b of the movable conical pulley component 56 can be avoided.

Consequently, the life of each seal member 2 and 4 is improved due to a reduction of a wear out generated on the seal members 2 and 4.

In addition, since the first cylinder member 3 is a thin member, a rigidity of the first cylinder member 3 by connecting a midway through the first cylinder member 3 to the second cylinder member 5 can be improved.

Furthermore, since the ring member 6 is attached onto the first cylinder member 3, the rigidity of the pulley cylinder arrangement can be improved. In addition, it is not necessary to attach another rotor member for the revolution speed sensor 100 into the ring member.

It is noted that although FIG. 2 shows an example of forming a rotor on a side surface of the outer surfaces of the ring member 6, the rotor portion may be formed on the outer peripheral surface of the ring member 6 and the revolution sensor 100 may be disposed so that the axle of the rotor faced radially toward an upward part of FIG. 2.

Similarly, the peripheral mutual displacements of the second piston member 8 with respect to the hollow cylindrical portion 56b of the movable conical pulley component 56 are limited by means of the, so-called, the width-across-flats fitting.

Hence, the lateral slips and twists of the third seal member 9 interposed between the outer peripheral surface of the second piston member 8 and the second cylinder member 5 can be avoided. Consequently, since the wear out generated on the seal member 2 is reduced, the life of the seal member 2 is improved.

Such a simple acceptance of the width-across-flats fitting as described above is considered as the (revolution) stopper between the ring member 6 and the second cylinder member 5.

Since, in the embodiment, both of the first cylinder member 3 and second cylinder member 5 are coupled in a spline coupling, a slight play is present in the peripheral direction. However, a minute displacement of the slight play is compensated for due to a slight peripheral deflection of the seal members 2 and 4. This can be applied equally well to the seal member 9 between the second piston member 8 and the second cylinder member 5.

In addition, a gap corresponding to the play is formed when such a play as described above occurs. However, since the second piston member 8 is pressed against the step portion 56d of the hollow cylindrical portion 56b by means of the hydraulic fluid pressure, the working fluid is not leaked through the gap of the play even though such a stopper as described above is adopted.

The stopper may be constituted by a key coupling in addition to a welding, press fitting, spline coupling, and the width-across-flats fitting. In the case of the key coupling, it is necessary to provide a key stop.

It is noted that the drive shaft 24 corresponds to the shaft portion of the stationary conical pulley component and the rear surface of the movable conical pulley component includes: the rear surface of the movable conical pulley main body 56a (having the rear recessed portion 56c); and the outer peripheral surface of the hollow cylindrical portion 56b having the outer peripheral end.

The stationary (first) and movable (second) conical pulley components (also, called a stationary sheave and a movable sheave, respectively) are exemplified by a U.S. Pat. No. 5,439,419 issued on Aug. 8, 1995 (the disclosure of which is herein incorporated by reference).

What is claimed is:

1. A pulley arrangement comprising:
   a first conical pulley component including a shaft portion and a first conical face;
   a second conical pulley component slidably mounted onto the shaft portion for rotation therewith and including a second conical face facing the first conical face, the second conical pulley component being slidable on the shaft portion to vary a distance between the first and second conical faces;

a first piston member coaxial with the shaft portion and having one end fixed onto a rear surface of the second conical pulley component, the first piston extending away from the second conical face;

a first seal member;

a first cylinder member coaxial with the shaft portion, the first cylinder member having an inner peripheral surface slidably engaging an opening end of the first piston member via the first seal member and extending away from the second conical face the first piston member, the first cylinder member, and the rear surface of the second conical pulley component defining a first cylinder chamber;

a second seal member via which an inner peripheral end of the first cylinder member slidably engages the rear surface of the second conical pulley component;

a second cylinder member coaxial with the shaft portion and having an opening end engaging the first cylinder member to support the first cylinder member in an axial direction of the shaft portion, and having an inner peripheral end mounted onto an outer peripheral surface of the shaft portion;

a third seal member;

a second piston member coaxial with the shaft portion and having an outer peripheral surface slidably engaging an inner peripheral end of the second cylinder member in the axial direction of the shaft portion via the third seal member, the second piston member having an inner peripheral surface fixed onto the rear surface of the second conical pulley component, the second cylinder member, the second piston member, and the shaft portion defining a second cylinder chamber; and a first stopper provided with a locking mechanism coupling the first cylinder member and the second cylinder member and limiting mutual movements of both the first cylinder member and the second cylinder member in a peripheral direction of each of the first and second cylinder members, and further limiting the first and second cylinder members from axially moving relative to each other.

2. A pulley arrangement as claimed in claim 1, wherein the second conical pulley component includes:

a conically shaped main body having the second conical face facing the first conical face of the first conical pulley component, and a rear recessed portion on the rear surface of the conically shaped main body; and a hollow cylindrical portion integral with the conically shaped main body, and coaxially and slidably arranged along an outer peripheral surface of the shaft portion, wherein the one end of the first piston member is fixed onto the rear recessed portion, the inner peripheral end of the first cylinder member slidably engages an outer peripheral surface of the hollow cylindrical portion of the second conical pulley component via the second seal member, and the inner peripheral surface of the second piston member is mounted onto an outer peripheral surface of the hollow cylindrical portion of the second conical pulley component and positioned opposite to the conically shaped main body to define the second cylinder chamber together with an inner side wall portion of the second cylinder member.

3. A pulley arrangement as claimed in claim 2, further including a second stopper provided between the inner peripheral end of the second piston member and the outer peripheral end of the hollow cylindrical portion to limit mutual movements of the second piston member and the hollow cylindrical portion in the peripheral direction of each of the second piston member and the hollow cylindrical portion.

4. A pulley arrangement as claimed in claim 3, wherein the second cylinder member has a substantially L-shaped cross-sectional portion, and the first stopper comprises a ring member arranged coaxially along an outer periphery of the second cylinder member and integrated with the L-shaped cross sectional portion of the first cylinder member, the ring member including an inner peripheral surface and an outer peripheral surface, a stopping member being interposed between the inner peripheral surface of the ring member and the L-shaped cross sectional portion of the second cylinder member, and convex portions being formed on the outer peripheral surface of the ring member at a regular interval along the peripheral direction of the outer peripheral surface of the ring member with respect to a reference circle (S1).

5. A pulley arrangement as claimed in claim 4, wherein the first stopper further comprises first engagement surface portions provided along the inner peripheral surface of the ring member and second engagement surface portions provided along the outer periphery of the second cylinder member, the first and second engagement surface portions being complementary to each other.

6. A pulley arrangement as claimed in claim 5, wherein the first and second engagement surface portions are mating splines.

7. A pulley arrangement as claimed in claim 6, wherein each end portions of the splines formed on the ring member is cut out obliquely with respect to an outer peripheral surface of the second cylinder member.

8. A pulley arrangement as claimed in claim 7, wherein the second cylinder member has a ring-shaped groove formed on the outer periphery thereof, a snap ring disposed in the ring-shaped groove, and occupying the space formed by the spline cut-outs to limit an axial displacement of the first cylinder member with respect to the second cylinder member.

9. A pulley arrangement as claimed in claim 3, wherein the second stopper comprises at least a first pair of planes constituting a width-across-flats fitting and formed on the outer periphery of the hollow cylindrical portion of the second conical pulley component and at least a second pair of planes constituting the width-across-flats fitting and formed on the inner peripheral surface of the second piston member, at least one of the first pair of planes being engageably opposed to one of the second pair of planes.

10. A pulley arrangement as claimed in claim 9, wherein one of the first pair of planes and one of the second pair of planes are diametrically opposed to the other of the first pair of planes and the other of the second pair of planes.

11. A pulley arrangement as claimed in claim 10, wherein the first and second pairs of planes are parallel to each other.

12. A pulley arrangement as claimed in claim 10, further including an endless belt wound on both mutually opposing first and second conical faces by which an approximately letter V-shaped groove is formed, and the shaft portion of the first conical pulley component including an axially extending working fluid pressure passage, at least one radially extending working fluid pressure passage fluidly communicating the first cylinder chamber and the axially extending working fluid pressure passage, and at least one radially extending working fluid pressure passage fluidly communicating the second cylinder chamber and the axially extending working fluid pressure passage.

13. A pulley arrangement comprising:

a first conical pulley component including a shaft portion and a first conical face;

a second conical pulley component slidably mounted onto the shaft portion for rotation therewith and including a second conical face facing the first conical face, the second conical pulley component being slidable on the shaft portion to vary a distance between the first and second conical faces;

a first piston member coaxial with the shaft portion and having one end fixed onto a rear surface of the second conical pulley component, the first piston extending away from the second conical face;

a first seal member;

a first cylinder member coaxial with the shaft portion, the first cylinder member having an inner peripheral surface slidably engaging an opening end of the first piston member via the first seal member and extending away from the second conical face, the first piston member, the first cylinder member, and the rear surface of the second conical pulley component defining a first cylinder chamber;

a second seal member via which an inner peripheral end of the first cylinder member slidably engages the rear surface of the second conical pulley component;

a second cylinder member coaxial with the shaft portion and having an opening end engaging the first cylinder member to support the first cylinder member in an axial direction of the shaft portion, and having an inner peripheral end mounted onto an outer peripheral surface of the shaft portion;

a third seal member;

a second piston member coaxial with the shaft portion and having an outer peripheral surface slidably engaging an inner peripheral end of the second cylinder member in the axial direction of the shaft portion via the third seal member, the second piston member having an inner peripheral surface fixed onto the rear surface of the second conical pulley component, the second cylinder member, the second piston member, and the shaft portion defining a second cylinder chamber;

a first stopper coupling the first cylinder member and the second cylinder member and limiting mutual movements of both the first and second cylinder members in a peripheral direction of each of the first and second cylinder members, and further limiting the first and second cylinder members from axially moving relative to each other; and a second stopper provided between the inner peripheral surface of the second piston member and an outer peripheral end of a hollow cylindrical portion of the second conical pulley component for limiting mutual movements of the second piston member and the hollow cylindrical portion in the peripheral direction of each of the second piston member and the hollow cylindrical portion.

* * * * *